(No Model.)

E. WESTON.
INDICATOR FOR ELECTRIC CURRENTS.

No. 531,669. Patented Jan. 1, 1895.

Witnesses:
D. N. Hayford
H. P. Holler

Inventor:
Edward Weston
by Park Benjamin
his attorney.

UNITED STATES PATENT OFFICE.

EDWARD WESTON, OF NEWARK, NEW JERSEY.

INDICATOR FOR ELECTRIC CURRENTS.

SPECIFICATION forming part of Letters Patent No. 531,669, dated January 1, 1895.

Application filed February 21, 1894. Serial No. 500,982. (No model.)

*To all whom it may concern:*

Be it known that I, EDWARD WESTON, of Newark, Essex county, New Jersey, have invented a new and useful Improvement in Indicating or Signaling Devices, of which the following is a specification.

My invention relates to visible signals, alarms or indications. It is here shown in the form adapted to the indices or pointers of measuring apparatus, which are moved into various positions by the force being measured; and more particularly to that class of apparatus, such as potential indicators for electrical circuits, in which an index is caused to move by the rise or fall of potential in the circuit above or below some fixed point at which the index stands at some predetermined mark. It is of considerable importance, in such cases, that slight movement of the index, from the datum point, should be easily and quickly recognized, and by means, moreover, which will not be liable to inaccurate reading by reason of parallax due to the position of the observer with reference to the index needle. So also it is important that the change in position of the needle should be visible from a distance, so that the attendant in an electric lighting station, for example, having his instruments disposed together in some particular place, can see, at a glance, from any part of the room, whether a needle has changed position, and thus not be obliged to remain close to the instrument and to watch it narrowly in order to detect such slight variations.

The principle of my present invention consists in so organizing the apparatus that any change in the position of the index or pointer will be immediately recognized by reason of the change in shape of a definite geometrical figure, which change will be easily visible from a distance sufficiently far for all practical purposes. While I have here shown this principle applied to an index or pointer of a measuring device, I wish it to be distinctly understood that I do not limit myself to this particular application, because the said principle may be embodied in many different forms of apparatus and in many ways, in all of which it serves as an efficient mode of visible signaling or of arresting attention.

Figure 4:
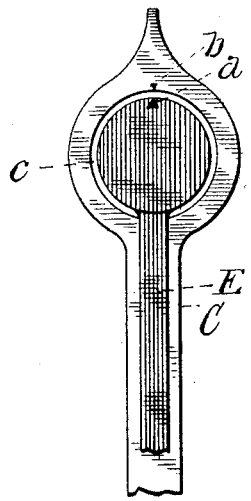
Figure 5:
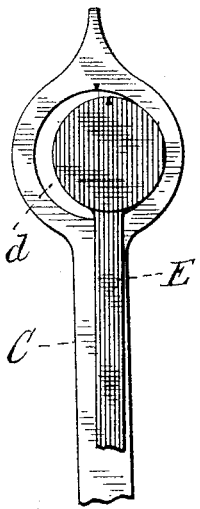
Figure 3:
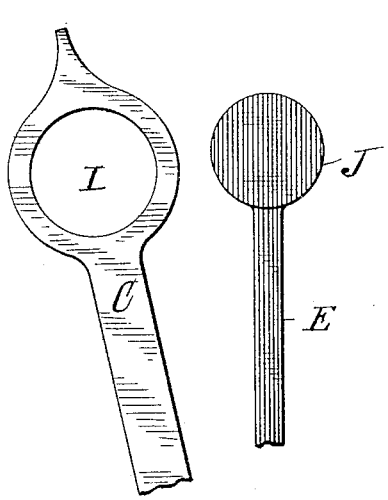
Figure 1:
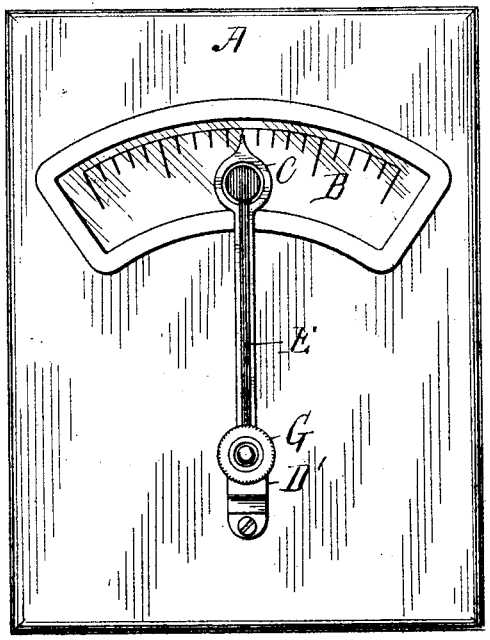
Figure 2:
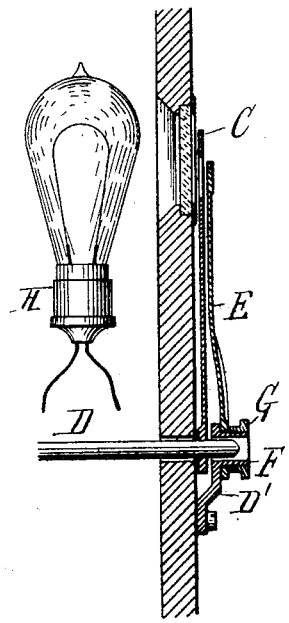

In the accompanying drawings, Figure 1 is a front view of a measuring instrument to which my invention is applied. Fig. 2 is a sectional view of the front cover or face of such an instrument showing one mode in which my invention may be constructed. Fig. 3 shows the index needle or pointer and the disk hereinafter referred to separately. Fig. 4 shows the index and disk disposed so that there is an annular space between the outer periphery of the disk and the inner periphery of the circular opening in the pointer. Fig. 5 shows the index and disk disposed so that the shape of this space is changed from annular to crescent form.

Similar letters of reference indicate like parts.

A represents the face of any measuring instrument. B is a scale thereon. C is the index needle or pointer which moves over said scale.

As shown in Fig. 2, D is an arbor actuated by the force to be measured by any suitable means so as to carry the index C, which is fast thereon, over the scale B.

On the face A is a bracket, D', carrying a sleeve, F, upon which is received a finger, E. This finger may be turned on said sleeve and clamped in position as adjusted by means of the jam nut G, which is received upon the threaded outer part of said sleeve. The index C and the finger E turn about the same center; and, as is obvious, the free movement of the index is not in anywise interfered with by the presence of the finger E.

Preferably I make the scale-plate B of ground glass or other translucent material, and support behind it a light, such as an electric glow-lamp, H, by any suitable means.

The index needle C is enlarged at its end, and has in its enlarged portion a circular opening, I. On the end also of the finger E is a circular disk, J. The disk J is of less diameter than the opening I, and is concentric with said opening.

The device operates in the following manner: Let it be assumed that the middle point on the scale in Fig. 1 is that at which it is desired that the index should stand uniformly, and that it is also required that any deviation of the index from that point should be susceptible of immediate recognition. The index C, having been brought to the desired indication, the nut G is loosened and the finger E is moved until its disk J stands exactly in front of the opening I in the index. This is readily done by bringing a mark, as $a$, on the disk into coincidence with a mark, as $b$, on the edge of the opening. Then obviously, as shown in Fig. 4, the space $c$ between the disk J and the circumference of opening I, will be annular in form. This figure can be made easily recognizable by the eye by making the index and the disk black and the scale face white, so that the annular white figure will thus be sharply outlined; or, better, if the scale-plate be made translucent, the light shining through it will make the figure brightly illuminated and easily discerned from quite a long distance. Now if a change occur in the force controlling the index C, so that it is caused to move in one direction or the other to a new position on the scale, then the symmetrical relation of its opening I to the disk J will be disturbed, and the space between said disk and the circumference of the opening will no longer be annular, but in the form of a crescent, as shown at $d$ in Fig. 5. The difference between the annular figure $c$ of Fig. 4 and the crescent figure $d$ of Fig. 5 is so plainly obvious from the drawings, that no further reference is needed to the ease with which the change will be recognized. All that the attendant, therefore, has to watch for is a change in the shape of a certain figure, which last may be a spot of light. The instant he sees a crescent instead of a ring, he knows, if he is in charge of an electric light station, that the potential on his line has fallen or gone higher, and attention to the circuit is necessary at once. It is hardly necessary to add that in such cases prompt action often saves large losses in current.

I claim—

1. An indicating or signaling device composed of two bodies movable with reference to one another, one of said bodies having an opening and the other, of less area, being disposed before said opening, (whereby the relative movement of said bodies is shown by the change in outline of the space included between the outer periphery of said body of less area and the inner periphery of said opening), and a scale of translucent material in rear of said bodies and a source of illumination in rear of said scale.

2. The combination in a signaling or indicating instrument of a pivoted index arm having an opening, and a second arm independently pivoted concentrically with said index and carrying a disk or plate of less area than and disposed before said opening.

3. The combination in a signaling or indicating instrument of a pivoted index arm having an opening, and a second arm pivoted concentrically with said index and carrying a disk or plate of less area than and disposed before said opening, and means for adjusting and holding said second arm in definite position.

4. The combination in a signaling or indicating instrument of the pivoted index-arm C having the circular opening H, a means of actuating said arm and the finger E pivoted concentrically with and in front of said arm and provided with the disk J of less area than said opening I; said disk being disposed in front of said opening.

EDWARD WESTON.

Witnesses:
H. R. MOLLER,
M. BOSCH.